No. 884,461. PATENTED APR. 14, 1908.
C. F. BROWNE.
HOSE COUPLING.
APPLICATION FILED APR. 10, 1907.

Inventor
Charles F. Browne

Witnesses

By Geo. A. Vashon
Attorney

UNITED STATES PATENT OFFICE.

CHARLES F. BROWNE, OF WASHINGTON, DISTRICT OF COLUMBIA.

HOSE-COUPLING.

No. 884,461.   Specification of Letters Patent.   Patented April 14, 1908.

Application filed April 10, 1907. Serial No. 367,395.

*To all whom it may concern:*

Be it known that I, CHARLES F. BROWNE, a citizen of the United States, residing at the city of Washington, in the District of Columbia, have invented new and useful Improvements in Hose-Couplings, of which the following is a specification.

This invention relates to hose couplings of the type wherein the coupling members are threaded into the ends of the hose sections, and has for its objects to provide a comparatively simple, inexpensive device of this character in which the coupling members may be readily screwed into the hose and one in which said members will be securely fixed against retrograde or unscrewing movement.

With these and other objects in view, the invention comprises the novel features of construction and combination of parts more fully hereinafter described.

Figure 1:
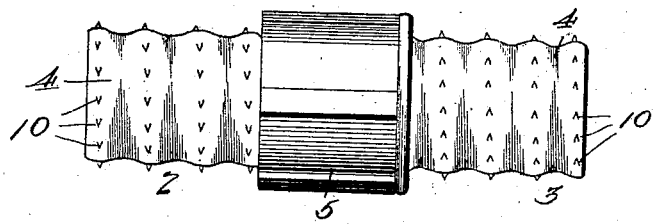
Figure 2:
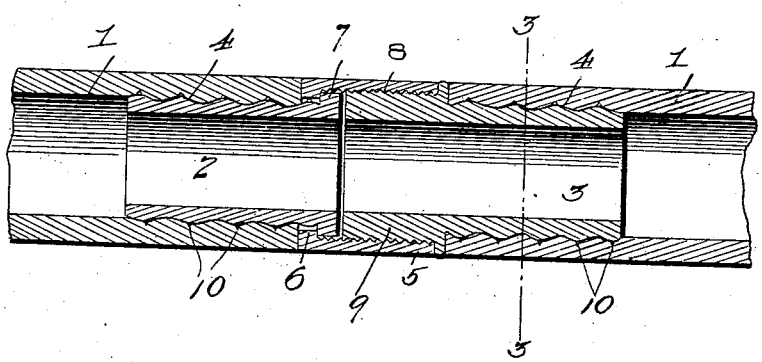
Figure 3:
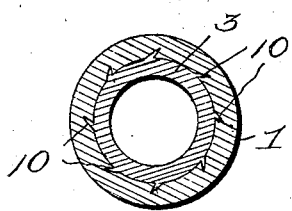

In the accompanying drawings, Figure 1 is a side elevation of a hose coupling embodying the invention. Fig. 2 is a longitudinal section taken centrally through the coupling and showing the same applied for use. Fig. 3 is a detail cross section taken on the line 3—3 of Fig. 2.

Referring to the drawings it will be seen that the coupling member which connects the hose sections 1 comprises a pair of coupling members 2 and 3 provided with screw threaded necks 4 which enter the meeting ends of the sections 1 and are in turn connected by a coupling member or nut 5 having at one end an inwardly projecting flange 6 adapted for engagement with a corresponding outwardly projecting flange 7 formed on the end of the member 2, the nut 5 being internally threaded as at 8 for detachable engagement with a similarly threaded head 9 formed on the hose engaging member 3.

The foregoing parts are of the usual or any appropriate form and material and the members 2 and 3 may be connected together in any suitable manner, otherwise than by the nut 5, the essential feature being that the coupling members 2 and 3 be provided with the screw threaded portions which enter and have threaded engagement with the adjacent ends of the hose sections 1.

In accordance with the present invention the coupling members 2 and 3 are provided on their threaded portions 4, which enter the hose sections 1, with transverse extending rearwardly pitched engaging spurs or teeth 10 adapted to engage the material of the sections 1 for fixing the coupling members 2 and 3 against backward or retrograde movement, thus to prevent accidental disengagement of the hose from the coupling members, it being understood that the slope of the spurs or teeth 10 is such as to permit ready forward rotation of the members in the operation of engaging them with the sections 1, while the threads on the portions 4 will as usual prevent the sections 1 from escaping by a relative longitudinal movement of the parts from the members 2 and 3.

It will be observed that while the device is of a simplified nature the teeth 10, which may be inexpensively formed during the course of manufacture, serve as an effectual means for preventing the coupling members from unscrewing.

What I claim is:

1. In a hose coupling, a tubular coupling member having an externally threaded portion adapted for screw threaded engagement with a hose section, and spurs provided on said threaded portion and arranged in circumferential alinement and disposed for engagement with the section to prevent retrograde or unscrewing movement of the member.

2. In a hose coupling, a tubular coupling member having an externally threaded neck adapted for screw threaded engagement with a hose section, and circumferentially disposed rearwardly pitched teeth in peripheral alinement provided on said threaded portion for engagement with the hose section to prevent retrograde or unscrewing movement of the member relative thereto.

In testimony whereof, I affix my signature in presence of two witnesses.

CHARLES F. BROWNE.

Witnesses:
 A. D. DAMMANN,
 S. C. HILL.